(12) United States Patent
Rai et al.

(10) Patent No.: US 7,554,079 B2
(45) Date of Patent: Jun. 30, 2009

(54) SIGNAL CONDITIONING FOR AN OPTICAL ENCODER

(75) Inventors: Abhay Kumar Rai, Ghazipur (IN);
Seng Yee Chua, Kuala Lumpur (MY);
Shaik Hameed Anantapur, Anantapur (IN)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 105 days.

(21) Appl. No.: 11/689,959

(22) Filed: Mar. 22, 2007

(65) Prior Publication Data

US 2008/0231326 A1 Sep. 25, 2008

(51) Int. Cl.
*G01D 5/34* (2006.01)
*H03M 1/22* (2006.01)
*G01B 11/14* (2006.01)

(52) U.S. Cl. .............................. 250/231.18; 250/231.13; 341/13; 356/617

(58) Field of Classification Search ................................
250/231.13–231.18, 214 R, 214 C, 214 DC, 250/205; 33/1 PT, 1 N; 341/11, 13, 31; 356/616, 617
See application file for complete search history.

(56) References Cited

U.S. PATENT DOCUMENTS

| 4,839,834 | A | * | 6/1989 | Omae et al. ................... 702/147 |
| 4,903,273 | A | | 2/1990 | Bathe |
| 5,241,173 | A | * | 8/1993 | Howley et al. ......... 250/231.16 |
| 5,444,613 | A | * | 8/1995 | Tani et al. ...................... 700/56 |
| 6,407,633 | B1 | * | 6/2002 | Dao ............................ 330/86 |
| 6,664,841 | B1 | | 12/2003 | Cetin et al. |
| 2004/0172208 | A1 | | 9/2004 | Freitag et al. |

FOREIGN PATENT DOCUMENTS

WO  WO 99/39439  8/1999

OTHER PUBLICATIONS

Avago Technologies, "AEDA-330 Series, Ultra Miniature, High Resolution Incremental Kit Encoders", Mar. 23, 2006, p. 1-10.
iC-Haus, "iC-MSB SIN/COS Signal Conditioner with 1Vpp Driver", 2006, p. 1-23.

* cited by examiner

Primary Examiner—Georgia Y Epps
Assistant Examiner—Don Williams

(57) ABSTRACT

An encoder with signal conditioning of an emitter drive signal is described. In one embodiment, the encoder includes a peak comparator, a pulse generator, a threshold comparator, and digital circuitry. The peak comparator outputs a peak comparator signal based on a comparison of an input sinusoidal signal stored at a first time with the input sinusoidal signal stored at a second time. The pulse generator determines a peak of the input sinusoidal signal based on the peak comparator signal. The threshold comparator compares a differential signal amplitude with a differential signal amplitude window at approximately the peak of the input sinusoidal signal. The differential signal amplitude is associated with the input sinusoidal signal. The digital circuitry generates an emitter modification signal in response to a determination that the differential signal amplitude is outside of the differential signal amplitude window.

20 Claims, 9 Drawing Sheets

SIGNAL CONDITIONING FOR AN OPTICAL ENCODER

BACKGROUND OF THE INVENTION

With the preponderance of precision motion detection using optical encoders, industries demand a high resolution motion encoder with interpolation of between 10× and 1000×. With such high resolution demands, conventional open-loop optical motion encoders are not able to meet these specifications. Typically, conventional encoders suffer from assorted problems such as device aging, process and temperature drifts, contamination on optical surfaces, and other problems that limit the resolution of the encoders.

A conventional approach to compensate for these problems is to use binning options, device trimming, or firmware calibrations. However, each of these implementations has some disadvantages. In general, these solutions increase testing complexity, increase die size, increase die cost, and/or require additional bond pads.

Another conventional approach to compensate for these problems is to use a signal conditioning feedback system. A signal conditioning feedback system detects and evaluates signals within the encoder and performs compensations to account for variations in the detected signals. However, conventional signal conditioning feedback systems also have disadvantages. For example, some conventional systems implement a low pass filter to extract the direct current (DC) component from an input signal. For low frequency applications (e.g., 1 KHz to 100 KHz), particularly for motion detection, the low pass filter uses a very big passive capacitor or active filters. Additionally, many conventional signal conditioning feedback systems are sensitive to process variations, if they are implemented without device trimming.

SUMMARY OF THE INVENTION

An encoder with signal conditioning of an emitter drive signal is described. In one embodiment, the encoder includes a peak comparator, a pulse generator, a threshold comparator, and digital circuitry. The peak comparator is configured to output a peak comparator signal based on a comparison of an input sinusoidal signal stored at a first time with the input sinusoidal signal stored at a second time. The pulse generator is configured to determine a peak of the input sinusoidal signal based on the peak comparator signal. The threshold comparator is configured to compare a differential signal amplitude with a differential signal amplitude window at approximately the peak of the input sinusoidal signal. The differential signal amplitude is associated with the input sinusoidal signal. The digital circuitry is configured to generate an emitter modification signal in response to a determination that the differential signal amplitude is outside of the differential signal amplitude window. Other embodiments of the apparatus are also described.

Embodiments of a method are also described. In one embodiment, the method is a method for conditioning an emitter drive signal of an optical encoder. The method includes comparing an input sinusoidal signal stored at a first time with the input sinusoidal signal stored at a second time to determine a peak of the input sinusoidal signal, comparing a differential signal amplitude with a differential signal amplitude window at approximately the peak of the input sinusoidal signal, and generating an emitter modification signal in response to a determination that the differential signal amplitude is outside of the differential signal amplitude window. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
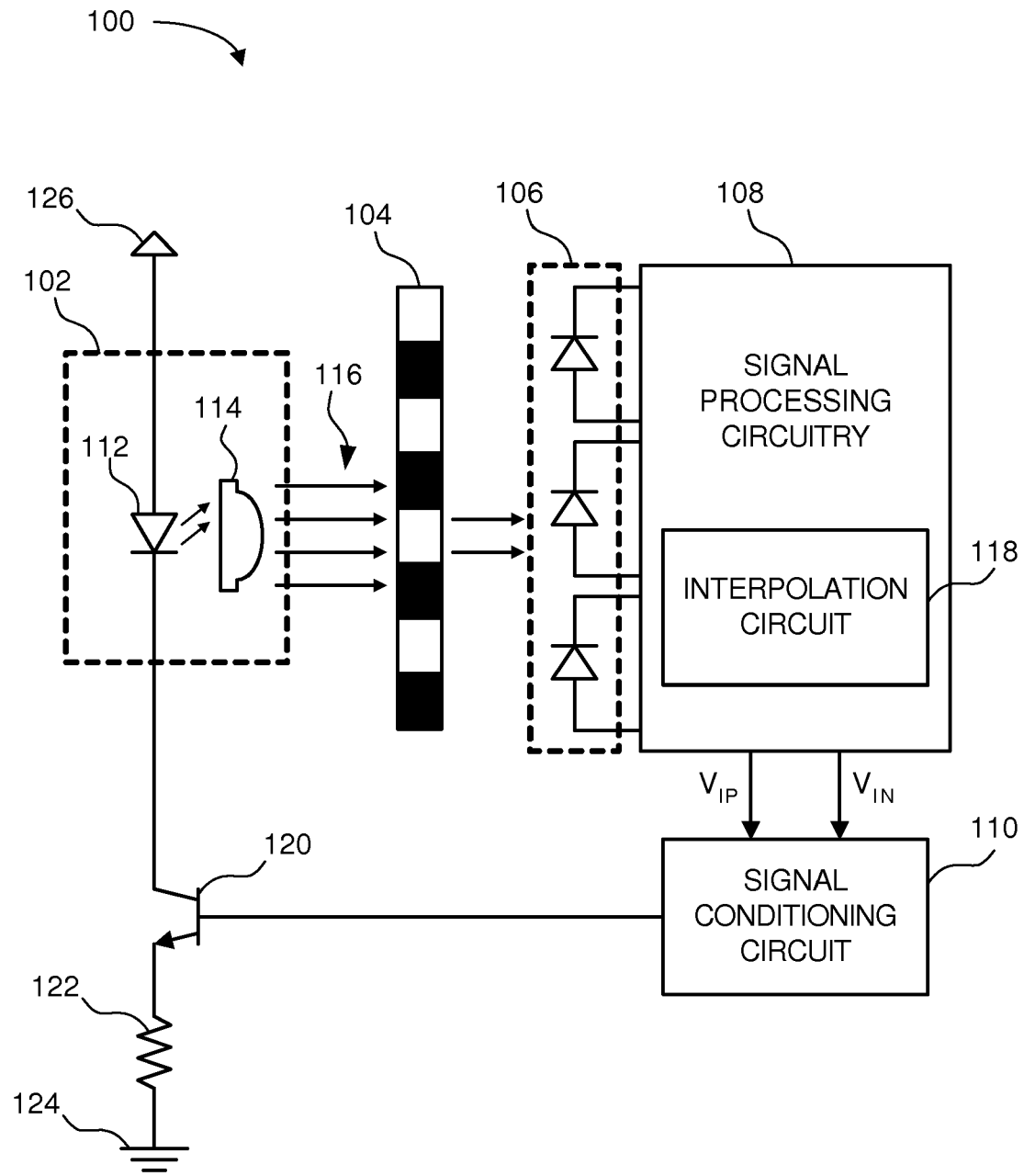
FIG. 1 depicts a schematic diagram of one embodiment of an optical encoder.

FIG. 1 depicts a schematic diagram of one embodiment of an optical encoder 100. The illustrated optical encoder 100 includes an emitter 102, a coding element 104, a photodiode array 106, and signal processing circuitry 108, and a signal conditioning circuit 110. The emitter 102 includes a light source 112 and a collimating lens 114. In one embodiment, the light source 102 is a light emitting diode (LED), although other types of light sources 102 may be used.

The light source 102 emits an optical signal 116 such as infrared or visible light through the collimating lens 114 toward the coding element 104. In one embodiment, the coding element 104 is a transmissive code wheel with one or more tracks of positioning and/or indexing segments. The positioning and/or indexing tracks allow the optical signal 116 to transmit through the coding element 104 in a modulated pattern to be detected by the photodetector array 106. Alternatively, the coding element 104 may be a code strip or other type of coding element. Moreover, although a transmissive coding element 104 is shown in the optical encoder 100 of FIG. 1, other optical encoders may use reflective or imaging coding elements.

In one embodiment, the photodiode array 106 includes multiple photodiodes arranged to detect the optical signal 116 transmitted through the coding element 104. For example, one embodiment of the photodiode array 106 includes six individual photodiodes, although other embodiments may implement fewer or more photodiodes in the photodiode array 106. In general, the photodiode array 106 converts the detected light pattern from the modulated optical signal 116 into one or more electrical signals for processing by the signal processing circuitry 108.

The accuracy of the signal processing may be limited by the resolution of the generated electrical signals, so some embodiments of the optical encoder 100 include an interpolation circuit 118 to increase the resolution of the optical encoder 100. In particular, the interpolation circuit 118 interpolates values relative to the electrical signals in order to increase the accuracy of the optical encoder 100.

In one embodiment, the electrical signals produced by the photodiode array 106 include a differential sinusoidal current signal (i.e., sinusoidal differential), a differential cosinusoidal current signal (i.e., cos differential), and a differential reference signal (i.e., reference differential). The sine differential current signal is designated as: $I_{sin+}, I_{sin-}$; the cos differential current signal is designated as: $I_{cos+}, I_{cos-}$; and the reference differential current signal is designated as: $I_{r+}, I_{r-}$.

The signal processing circuitry 108 then uses these electrical signals to determine, for example, the speed in a motion sensor. In one embodiment, these current signals are converted to voltage signals, for example, using one or more transimpedence amplifiers (TIAs). For example, $I_{sin+}$ and $I_{sin-}$ may be an input differential current signal to a transimpedence amplifier, which produces a differential voltage output of $V_{IP}$ and $V_{IN}$. One or both of the signal components of this differential voltage signal may be referred to as input voltages because they may be used as input signals to the signal conditioning circuit 110. The other differential current signals also may be converted to corresponding differential voltage signals.

In general, signal conditioning is used for detection, evaluation, and correction of the sinusoidal signal amplitude, so that the sinusoidal signal amplitude is relatively constant regardless of aging, temperature drifts, or process variations. More specifically, signal conditioning reduces the differential signal amplitude when it is too high (e.g., due to process variations or temperature drifts) and increases the differential signal amplitude when it is too low (e.g., due to aging, process variations or temperature drifts).

Figure 10:
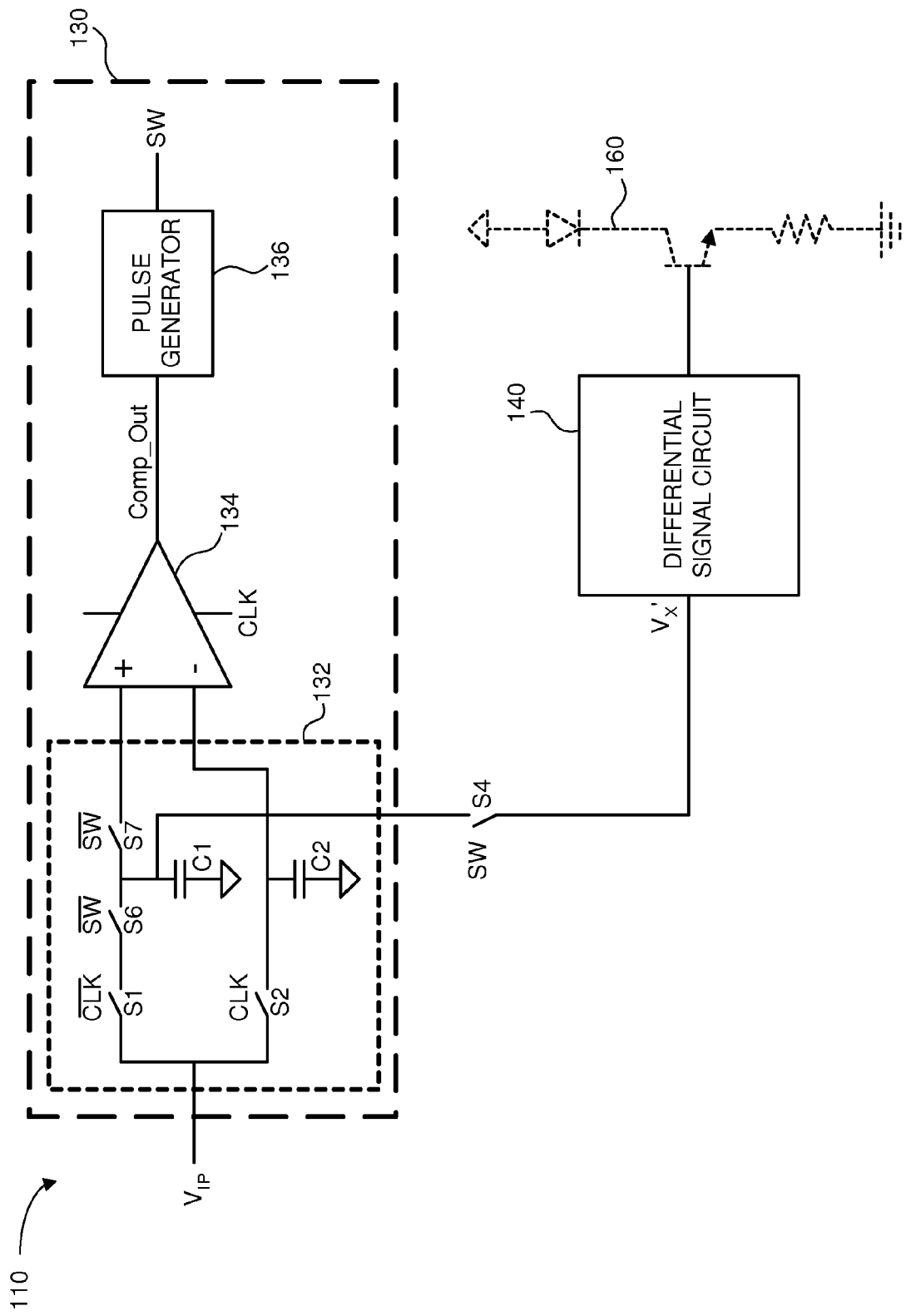
FIG. 10 depicts a schematic diagram of an alternative embodiment of a signal conditioning circuit to detect a peak value, instead of a peak-to-peak value, of an input signal.

The complete signal conditioning cycle can be divided into three operations, including detection of the occurrence of a peak, measurement of a peak-to-peak value and comparison with a reference value, and incrementing or decrementing a biasing voltage to adjust the emitter current accordingly. It should be noted that, although the embodiment described herein uses the peak-to-peak value of the sinusoidal signal amplitude, other embodiments may implement a signal conditioning circuit 110 which uses the peak value. Where only the peak value is used, the signal conditioning circuit 110 may receive a single input of either the positive input voltage, $V_{IP}$, or the negative input voltage $V_{IN}$ (as shown in FIG. 10). Additional details of an exemplary embodiment of the signal conditioning circuit 110 are shown and described in more detail with reference to FIG. 2.

The signal conditioning circuit 110 ultimately outputs an analog emitter modification signal to control a transistor 120 coupled to the emitter light source 112. In one embodiment, the transistor 120 is a bipolar junction transistor (BJT). The emitter modification signal controls the base voltage of the bipolar junction transistor 120 and, hence, increases or decreases the emitter current to the emitter 102, as well as the input differential signal amplitude. The emitter 102 and transistor 120 are also coupled to a load resistor 122, a ground reference 124, and a signal source 126.

Figure 2:
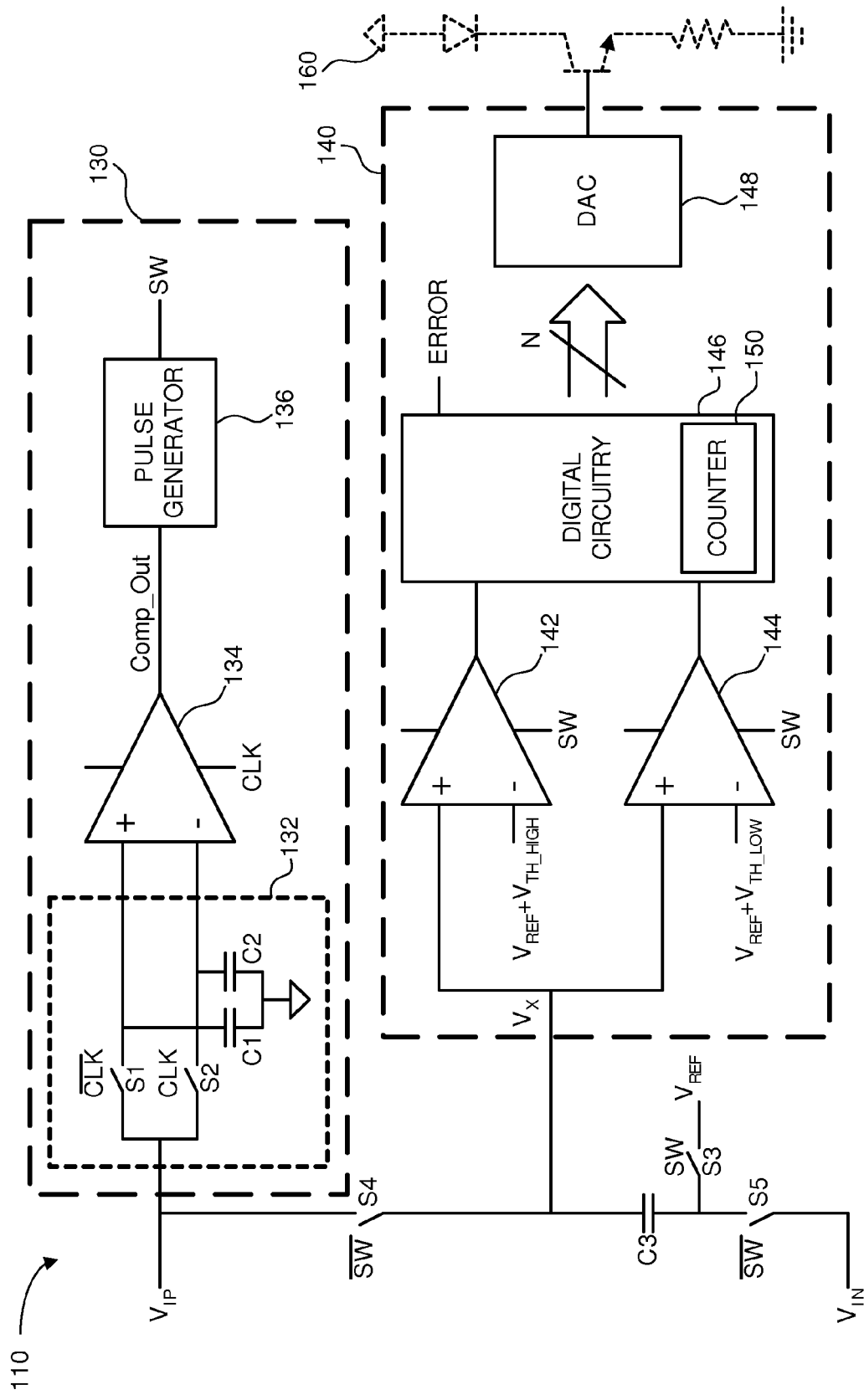
FIG. 2 depicts a schematic diagram of one embodiment of the signal conditioning circuit of the optical encoder shown in FIG. 1.

FIG. 2 depicts a schematic diagram of one embodiment of the signal conditioning circuit 110 of the optical encoder 100 shown in FIG. 1. The illustrated signal conditioning circuit 110 includes a peak detector 130 and a differential signal circuit 140. In general, the peak detector 130 detects an occurrence of a peak of an input sinusoidal signal such as the positive input voltage, $V_{IP}$. The differential signal circuit 140 generates the emitter modification signal to adjust the emitter current to the emitter circuit 160 (shown dashed), including the emitter light source 112.

In one embodiment, the peak detector 130 includes a switched capacitor circuit 132, a peak comparator 134, and a pulse generator 136. The switched capacitor circuit 132 receives the input sinusoidal signal, as well as a clock signal, CLK, and samples the input sinusoidal signal at different times according to the clock signal. In one embodiment, the capacitors, C1 and C2, are matched capacitors. For example, capacitor C1 samples the input sinusoidal signal on a low clock level (designated as $\Phi 2$ in FIG. 5). Similarly, capacitor C2 samples the input sinusoidal signal on a high clock level (designated as $\Phi 1$ in FIG. 5).

In one embodiment, the peak comparator 134 compares the samples stored on capacitors C1 and C2 and outputs a peak comparator signal, Comp_Out. The peak comparator 134 may be a latched comparator. The peak comparator signal indicates whether the sample stored in capacitor C2 has a higher or lower value than the sample stored in capacitor C1. For example, if the sample stored in C2 is higher than the sample stored in C1, then the peak comparator 134 outputs a logical "0" to indicate that the input sinusoidal signal is increasing over time. However, if the sample stored in capacitor C2 is lower than sample stored in capacitor C1, then the peak comparator outputs a logical "1" to indicate that the input sinusoidal signal is decreasing over time. The change from a logical "0" to a logical "1" indicates the occurrence of a positive peak in the input sinusoidal signal. Similarly, the change from a logical "1" to a logical "0" indicates the occurrence of a negative peak, or valley. In one embodiment, the peak comparator 134 is clocked by the clock signal in the input sinusoidal signal.

It should be noted that these designations of the positive and negative peaks of the input sinusoidal signal are approximate relative to the actual peaks of the input sinusoidal signal. In any case, the designation of the positive and negative peaks of the input sinusoidal signal are at most one clock cycle after the actual peak, depending on the when the peak comparator 134 detects the change in direction of the input sinusoidal signal. For example, if a sample is stored in capacitor C1 at the actual peak of the input sinusoidal signal, and a subsequent sample is stored in capacitor C2 one half clock cycle later, then the comparison of these stored samples will occur at the next rising edge of the clock cycle, which occurs one full clock cycle after the sample was stored in capacitor C1. Hence, the designation of the positive peak is approximate because it occurs up to one clock cycle after the actual peak of the input sinusoidal signal.

Figure 3:
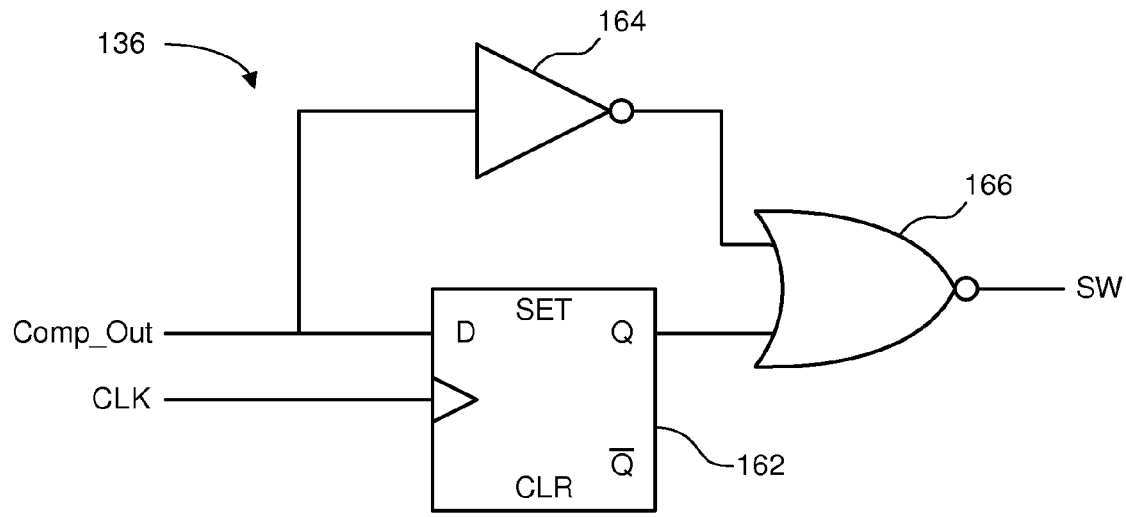
FIG. 3 depicts a schematic diagram of one embodiment of the pulse generator of the signal conditioning circuit shown in FIG. 2.
Figure 4:
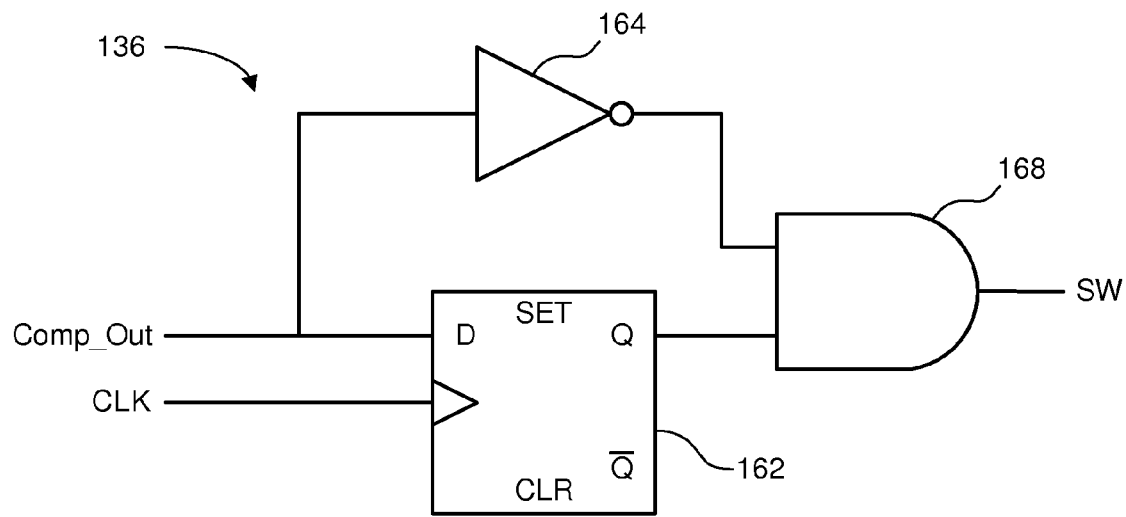
FIG. 4 depicts a schematic diagram of another embodiment of the pulse generator of the signal conditioning circuit shown in FIG. 2.

In one embodiment, the pulse generator 136 receives the peak comparator signal and generates a switch pulse, SW, for each cycle of the peak comparator signal. For example, the pulse generator 136 may generate a pulse at the rising edge of the peak comparator signal, which corresponds to the positive peak of the input sinusoidal signal. An exemplary pulse generator 136 to generate a pulse at the rising edge of the peak comparator signal is shown in FIG. 3. Alternatively, the pulse generator 136 may generate a pulse at the falling edge of the peak comparator signal, which corresponds to the negative peak of the input sinusoidal signal. An exemplary pulse generator 136 to generate a pulse at the falling edge of the peak comparator signal is shown in FIG. 4. The switch pulse, SW, is used to control other components of the signal conditioning circuit 110 such as switches S3, S4, and S5, and the threshold comparators 142 and 144 of the differential signal circuit 140. It should be noted that the signal conventions described herein are exemplary. Some embodiments of the pulse generator 136 and other components of the signal conditioning circuit 110 may be implemented to be compatible with an alternative signal convention for positive and negative, or logical high and logical low.

In one embodiment, the differential signal circuit 140 includes a high threshold comparator 142, a low threshold comparator 144, digital circuitry 146, and a digital-to-analog converter (DAC) 148. In one embodiment, the digital circuitry 146 also includes a counter 150.

The high and low threshold comparators 142 and 144 compare a differential signal amplitude, $V_{AMP}$, with high and low window thresholds of a differential signal amplitude window. One example of a differential signal amplitude window is shown and described in more detail with reference to FIG. 6. In order to compare the differential signal amplitude with the high and low window thresholds, the threshold comparators 142 and 144 actually may compare a voltage potential, $V_X$, developed on the capacitor C3 with the summation of a reference voltage, $V_{REF}$, and each of the threshold voltages, $V_{TH\_HIGH}$ and $V_{TH\_LOW}$. The voltage potential, $V_X$, developed on capacitor C3 is given by the following equation:

$$V_X = V_{REF} + (V_{IP} - V_{IN}) = V_{REF} + V_{AMP},$$

where $$V_{AMP} = V_{IP} - V_{IN}$$

As one example, the high threshold comparator 142 compares the voltage potential, $V_X$, developed on the capacitor C3 with $V_{REF} + V_{TH\_HIGH}$. Similarly, the low threshold comparator 144 compares the voltage potential, $V_X$, developed on the capacitor C3 with $V_{REF} + V_{TH\_LOW}$. Since $V_{REF}$ is the same in $V_X$ and the input reference signals to the high and low comparators 142 and 144, the comparison depends only on the differential signal amplitude, $V_{AMP}$, and the high and low window thresholds. So if the differential signal amplitude, $V_{AMP}$, is greater than the high window threshold, $V_{TH\_HIGH}$, then the high threshold comparator 142 outputs, for example, a logical high signal. Otherwise the high threshold comparator 142 outputs a logical low signal. Similarly, if the differential signal amplitude, $V_{AMP}$, is greater than the low window threshold, $V_{TH\_LOW}$, then the low threshold comparator 144 outputs, for example, a logical high signal. Otherwise the low threshold comparator 144 outputs a logical low signal.

In one embodiment, the digital circuitry 146 uses the outputs of the threshold comparators 142 and 144 to generate an emitter modification signal, which is then converted from a digital signal to an analog signal by the DAC 148 and transmitted to the emitter circuit 160. One example of the operation of the differential signal circuit 140 is described below.

If the input differential signal amplitude is greater than the high window threshold, $V_{TH\_HIGH}$, then both threshold comparators 142 and 144 show high at the output, as described above, and the digital circuitry 146 generates a smaller N-bit bit stream. This reduces the base voltage of the bipolar junction transistor 120 and also reduces the emitter current. Hence, the input differential signal amplitude is reduced. In contrast, if the input differential signal amplitude is smaller than the low window threshold, $V_{TH\_LOW}$, then both threshold comparators 142 and 144 show low at the output and the digital circuitry 146 generates a bigger N-bit bit stream. This increases the base voltage of the bipolar junction transistor 120 and also increases the emitter current. Hence, the input differential signal amplitude is increased. If the input differential signal amplitude is within the targeted differential signal amplitude window, then the high threshold comparator 142 outputs a logical low signal and the low threshold comparator 144 outputs a logical high signal. Accordingly, the N-bit bit stream will remain the same as the previous value. In one embodiment, the digital circuitry 146 is also configured to output an error signal if the input differential signal amplitude is outside of a detectable range.

If the digital circuitry 146 includes a counter 150, a simpler implementation may be to have the N-bit counter 150 either count up or count down one bit at a time based on the outputs of the high and low threshold comparators 142 and 144. For example, the counter 150 may perform according to Table 1 below. It should be noted that this implementation with the counter 150 may take several iterations to move the input differential signal amplitude to a value within the targeted differential signal amplitude window, depending on how much the differential signal amplitude deviates from the high and low window thresholds.

TABLE 1

Counter operation based on threshold comparator outputs.

| Signal peak-peak | High Threshold Comparator | Low Threshold Comparator | N-bit Counter |
|---|---|---|---|
| > targeted window | HIGH | HIGH | Count Down |
| < targeted window | LOW | LOW | Count Up |
| Within targeted window | LOW | HIGH | Unchanged |

FIG. 3 depicts a schematic diagram of one embodiment of the pulse generator 136 of the signal conditioning circuit 110 shown in FIG. 2. The pulse generator 136 of FIG. 3 is configured to generate a pulse when a positive peak occurs in the input sinusoidal signal. The illustrated pulse generator 136 includes a latch 162, an inverter 164, and a NOR gate 166. The latch 162 stores each peak comparator signal for one cycle of the clock signal. The inverter 164 inverts the peak comparator signal. In this way, the NOR gate 166 operates on the inverted peak comparator signal of the current clock cycle and the stored peak comparator signal of the previous clock cycle.

When the peak comparator signal goes high at the positive peak, the inverter 164 will invert the high signal to a low signal, and the D flip-flop 162 will output a low signal from the previous clock cycle, so the NOR gate 166 will output a logical high signal. On the next clock cycle, the inverter 164 will continue to invert the high signal to a low signal, but the D flip-flop 162 will output a high signal stored during the previous cycle, so the NOR gate 166 will return to a low signal. Moreover, when the peak comparator signal goes low at the negative peak, the inverter 164 will invert the low signal to a high signal, and the D flip-flop 162 will output a high signal from the previous clock cycle, so the NOR gate 166 will continue to output a logical low signal. In this way, the pulse generator 136 shown in FIG. 3 will output a switch pulse signal for a single clock cycle when the peak comparator signal goes high approximately at the positive peak of the input sinusoidal signal. An exemplary waveform is shown in FIG. 5 to depict the switch pulse at the positive peak of the input sinusoidal signal.

FIG. 4 depicts a schematic diagram of another embodiment of the pulse generator 136 of the signal conditioning circuit 110 shown in FIG. 2. In contrast to the pulse generator 136 of FIG. 3, the pulse generator 136 of FIG. 4 outputs a switch pulse signal for one clock cycle when the peak comparator signal goes low approximately at the negative peak of the input sinusoidal signal. The illustrated pulse generator 136 of FIG. 4 includes a D flip-flop 162, an inverter 164, and an AND gate 168. The latch 162 and the inverter 164 operate as described above. The AND gate 168 operates on the inverted peak comparator signal of the current clock cycle and the stored peak comparator signal of the previous clock cycle, similar to the NOR gate 166 described above.

As an example of the operation of the pulse generator 136 of FIG. 4, when the peak comparator signal goes low at the negative peak, the inverter 164 will invert the low signal to a high signal, and the D flip-flop 162 will output a high signal from the previous clock cycle, so the AND gate 168 will output a logical high signal. On the next clock cycle, the inverter 164 will continue to invert the low signal to a high signal, but the D flip-flop 162 will output a low signal stored during the previous cycle, so the AND gate 168 will return to a low signal. Moreover, when the peak comparator signal goes high at the positive peak, the inverter 164 will invert the high signal to a low signal, and the latch 162 will output a low signal from the previous clock cycle, so the AND gate 168 will continue to output a logical low signal. An exemplary waveform is shown in FIG. 5 to depict the switch pulse at the negative peak of the input sinusoidal signal. Once again, it should be noted that the signal conventions of positive and negative and high and low described herein may be changed in other implementations of the signal conditioning circuit 110. Accordingly, the logic gates and other components of the pulse generator 136 also may change to match the signal convention employed by the signal conditioning circuit 110.

Figure 5:
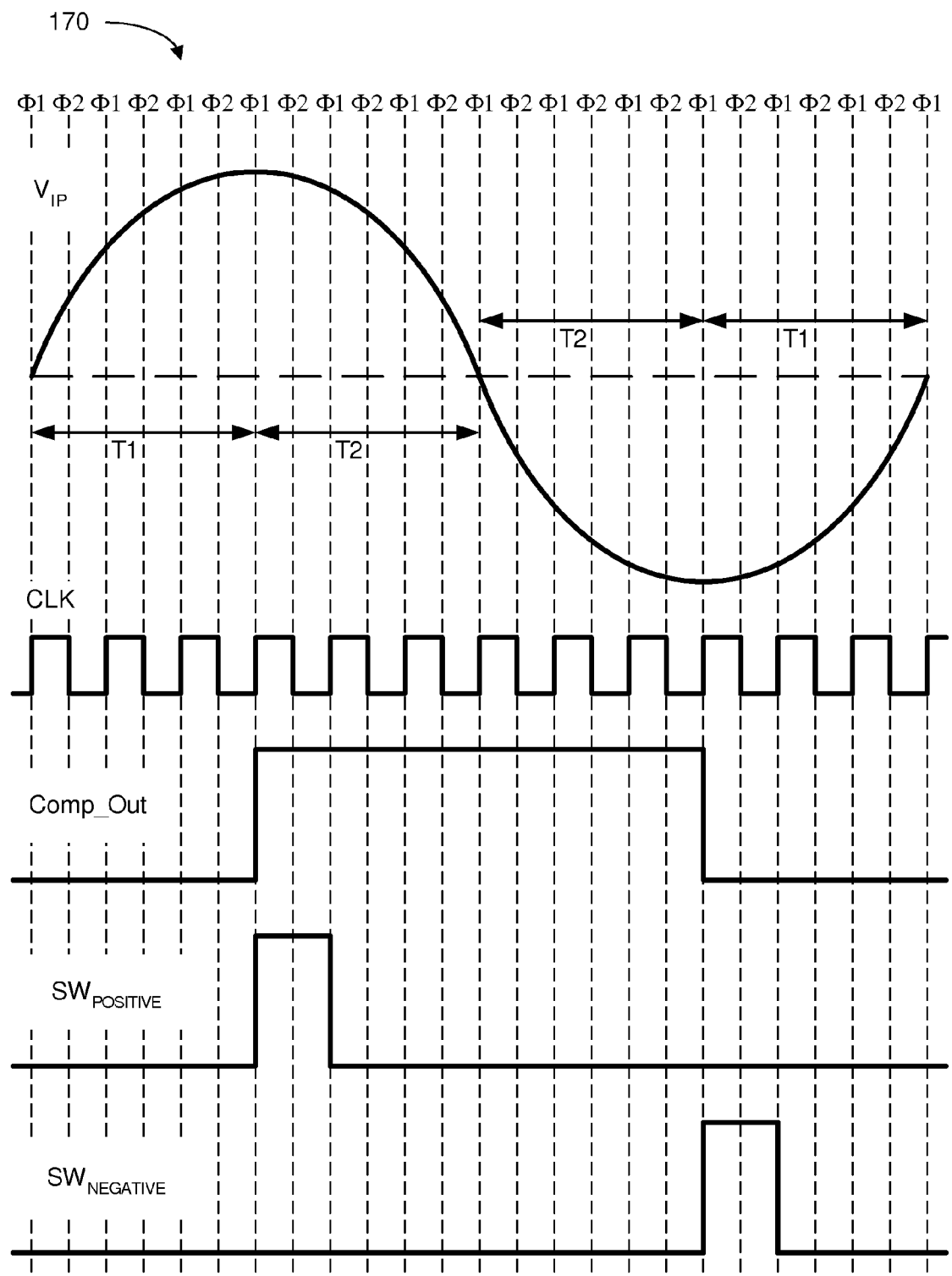
FIG. 5 depicts a wave diagram of various signals associated with the signal conditioning circuit shown in FIG. 2.

FIG. 5 depicts a wave diagram 170 of various signals associated with the signal conditioning circuit 110 shown in FIG. 2. In particular, the wave diagram 170 includes the input sinusoidal signal, $V_{IP}$, the clock signal, CLK, the peak comparator signal, Comp_Out, and two alternative switch pulse signals, $SW_{POSITIVE}$ and $SW_{NEGATIVE}$. As explained above, the positive switch pulse signal indicates the occurrence of a positive peak of the input sinusoidal signal, and the negative switch pulse signal indicates the occurrence of a negative peak, or valley, of the input sinusoidal signal. Additionally, the wave diagram 170 indicates the high level (i.e., Φ1) and the low level (i.e., Φ2) of the clock signal CLK.

With respect to the input sinusoidal signal, the time frames T1 and T2 indicate times when the input sinusoidal signal is rising or falling, respectively. In one embodiment, the input sinusoidal signal increases monotonically during time frame T1, and then it decreases monotonically during time frame T2. The transition from the time frame T1 to the time frame T2 is the time where input signal reaches its positive peak value. The transition from the time frame T2 to the time frame T1 is the time where input signal reaches its negative peak value.

As described above, when capacitor C2 is connected to the input sinusoidal signal at instance Φ2, capacitor C1 will hold the charge of previous sample taken at instance Φ1. Therefore, capacitor C2 will have higher potential then capacitor C1 during time frame T1 because the input sinusoidal signal is monotonically increasing. This forces the peak comparator 134 to maintain a logical low at its output during time frame T1. In one embodiment, the peak comparator 134 is a latched comparator, so the peak comparator 134 will continue to hold at low for each clock cycle until the input sinusoidal signal reaches its peak value. Subsequently, capacitor C2 will have a lower potential than capacitor C1 during time frame T2 because the input sinusoidal signal is monotonically decreasing. This forces the peak comparator 134 to be high at its output. The low to high transition at the peak comparator 134 will enable the pulse generator 136 to generate a switch pulse SW to isolate the capacitor C3 from input sinusoidal signal path $V_{IP}$ and $V_{IN}$ and connect it to the positive terminal of the threshold comparators 142 and 144 of FIG. 2 to compare the voltage potential, $V_X$, with the threshold reference voltages.

Figure 6:
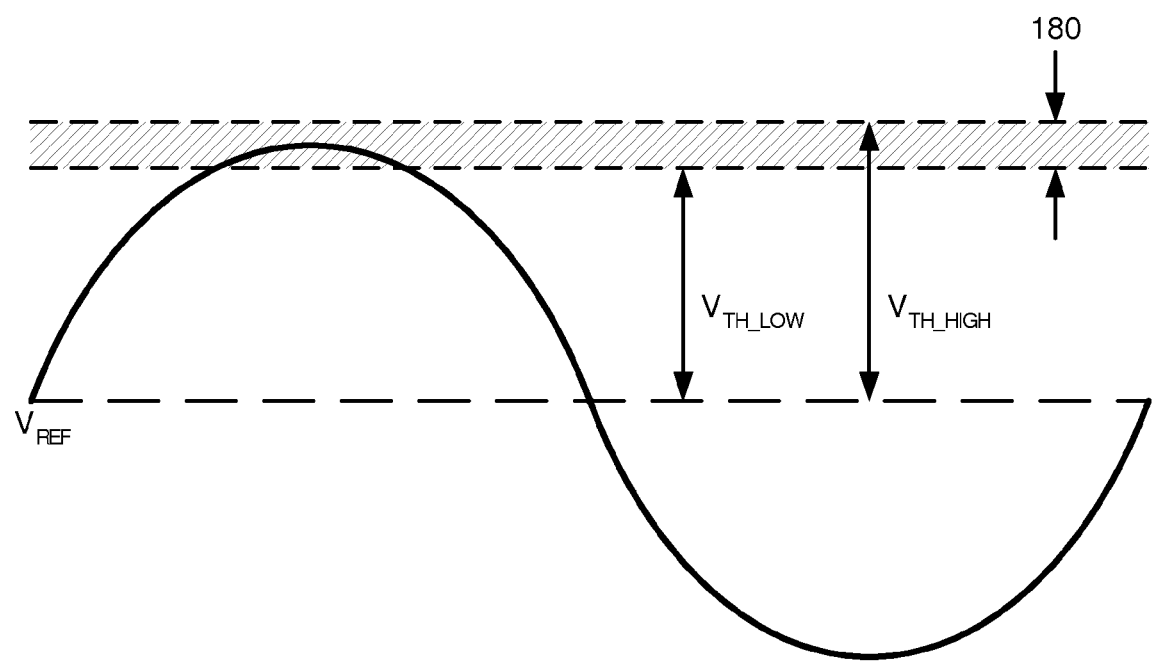
FIG. 6 depicts a schematic diagram of a differential signal amplitude window relative to an input differential signal.

FIG. 6 depicts a schematic diagram of a differential signal amplitude window 180 relative to an input differential signal. As explained above, the differential signal amplitude window 180 is defined by the low window threshold, $V_{TH\_LOW}$, and the high window threshold, $V_{TH\_HIGH}$.

Figure 7:
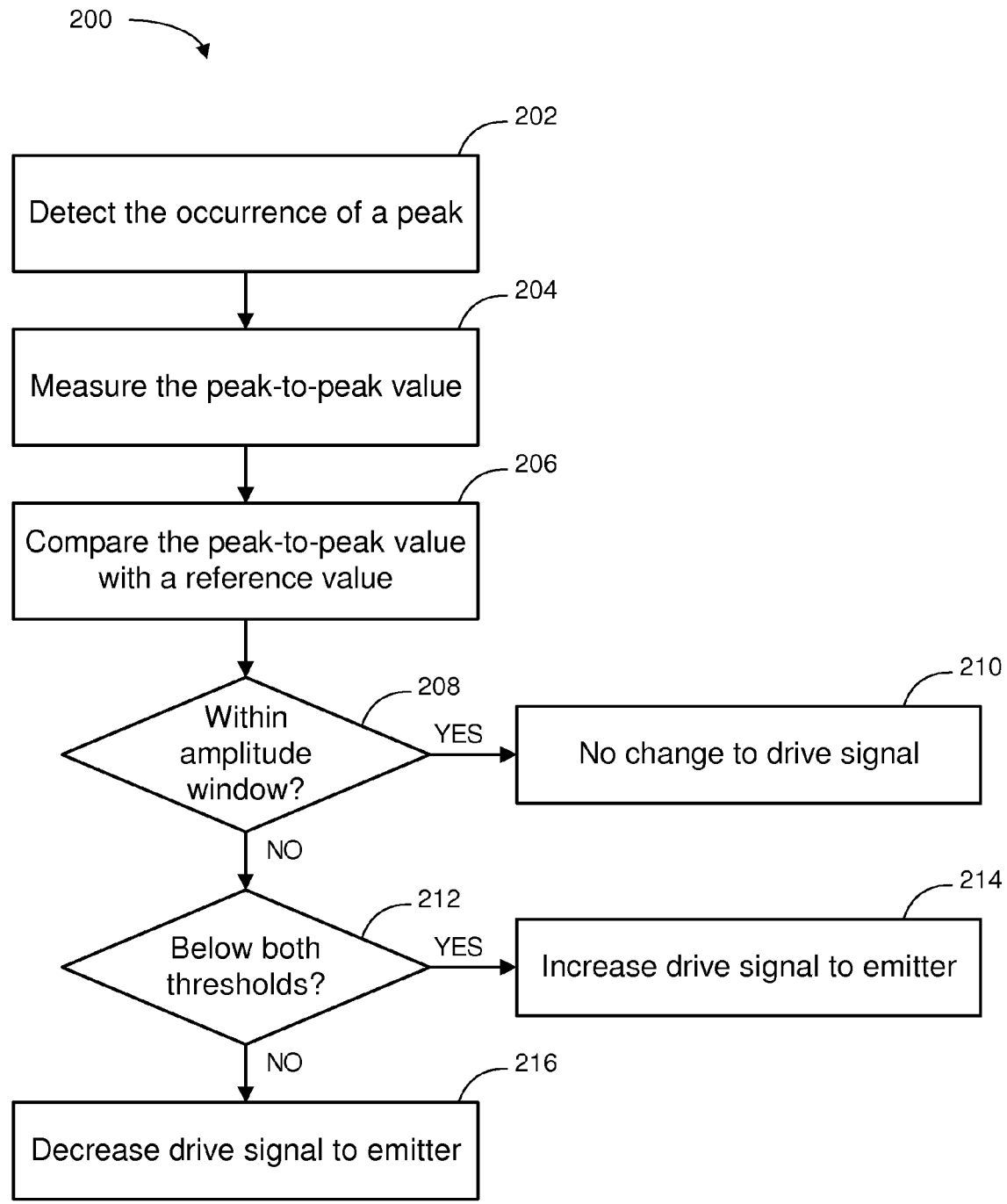
FIG. 7 depicts a schematic diagram of one embodiment of a method of operation for the optical encoder shown in FIG. 1.

FIG. 7 depicts a schematic diagram of one embodiment of a method 200 of operation for the optical encoder 100 shown in FIG. 1. Although references are made to the optical encoder 100 of FIG. 1, embodiments of the method 200 may be implemented in conjunction with other types of encoders.

At block 202, the peak detector 130 detects the occurrence of a peak of the input sinusoidal signal. At block 204, the signal conditioning circuit 110 measures the peak-to-peak value of the input sinusoidal signal. In one embodiment, the capacitor C3 is used to measure the peak-to-peak value of the input sinusoidal signal. Alternatively, another implementation of the signal conditioning circuit 110 may be configured to measure the peak-to-peak value of the input sinusoidal signal. In another embodiment, the signal conditioning circuit 110 may be configured to measure a peak value, instead of the peak-to-peak value, as described above. An example of a signal conditioning circuit configured to measure a peak value, instead of a peak-to-peak value, is shown and described in more detail with reference to FIG. 10.

At block 206, the threshold comparators 142 and 144 compare the peak-to-peak value of the input sinusoidal signal with one or more reference signals. For example, the differential signal amplitude may be compared with a high window threshold and a low window threshold. At block 208, the digital circuitry 146 determines if the differential signal amplitude is within the differential signal amplitude window 180. If it is, then there is no change to the emitter drive signal, as stated in block 210. Otherwise, if the differential signal amplitude is not within the differential signal amplitude window 180, then at block 212 the digital circuitry 146 determines if the differential signal amplitude is below both the high and low window thresholds. At block 214, if the differential signal amplitude is below both the high and low window thresholds, then the digital circuitry 146 generates an emitter modification signal to increase the drive signal to the emitter 102. Otherwise, at block 216, if the differential signal amplitude is above both the high and low window thresholds, then the digital circuitry 146 generates an emitter modification signal to decrease the drive signal to the emitter 102. The depicted method 200 then ends.

Figure 8:
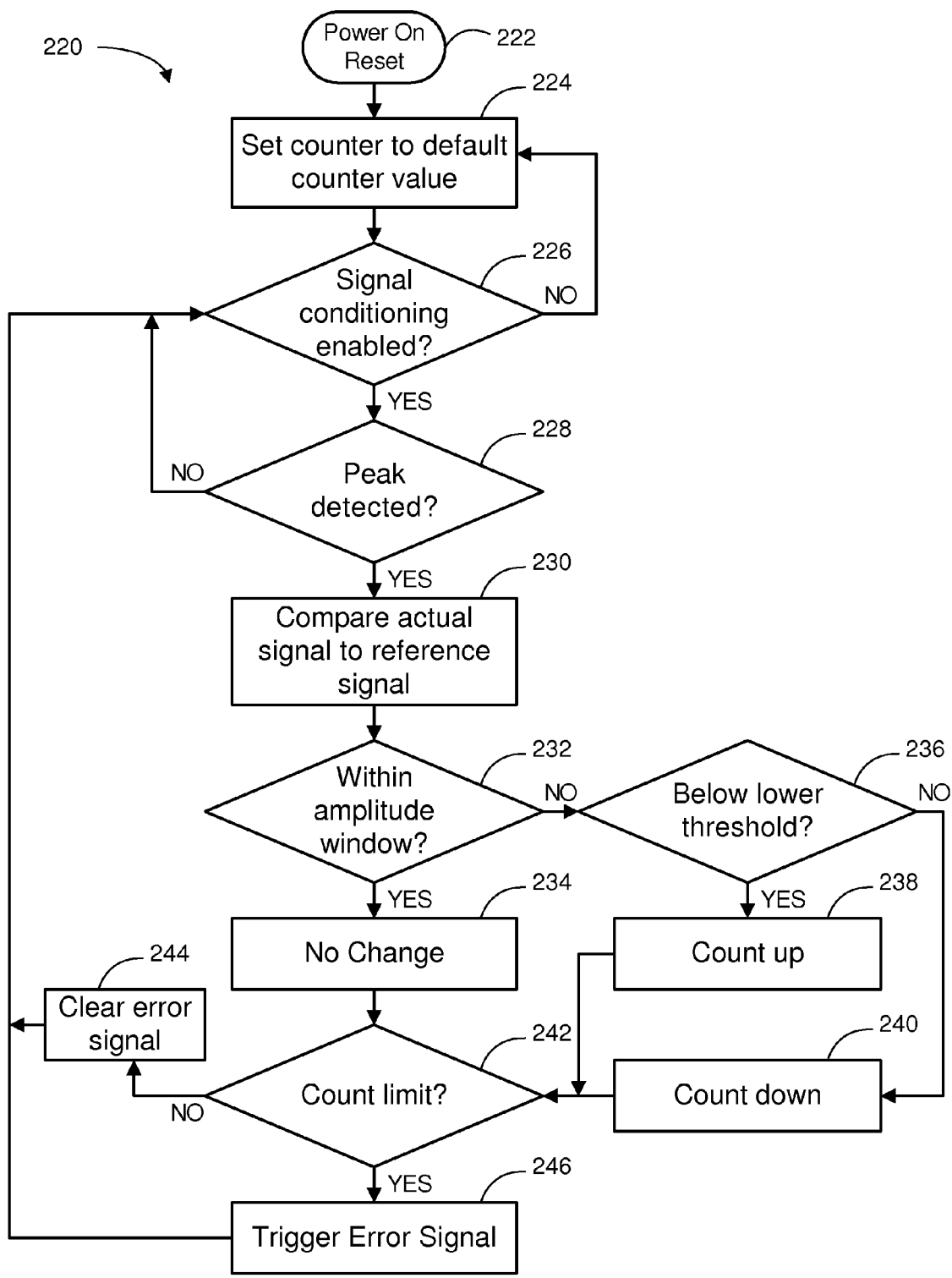
FIG. 8 depicts a schematic diagram of another embodiment of a method of operation for the optical encoder shown in FIG. 1.

FIG. 8 depicts a schematic diagram of another embodiment of a method 220 of operation for the optical encoder 100 shown in FIG. 1. Although references are made to the optical encoder 100 of FIG. 1, embodiments of the method 220 may be implemented in conjunction with other types of encoders.

At block 222, the depicted method 220 begins with a power on reset of the optical encoder 100. At block 224, the counter 150 is set to a default counter value. In one embodiment, the counter 150 determines the number of bits of the N-bit bit streams from the digital circuitry 146 to the DAC 148.

At block 226, the optical encoder 100 determines if signal conditioning is enabled. If signal conditioning is not enabled, then the optical encoder 100 does not proceed to implement at least some of the signal conditioning operations. Otherwise, if signal conditioning is enabled, then the optical encoder 100 proceeds to implement signal conditioning as shown.

There multiple ways to possible disable the signal conditioning operability. In one embodiment, signal conditioning may be enabled and disabled by using a dedicated pin in the chip on which the interpolator circuit 118 is implemented. Connecting this pin to a logical high signal connects the signal coming from a transimpedance amplifier to a signal conditioning path through a switch. Connecting this pin to a logical low signal bypasses the signal conditioning path and the input differential signal goes directly to the next stage. In another embodiment, the signal conditioning may be enable and disabled using software, firmware or digital control. For example, the software, firmware, or digital control may continuously apply a RESET signal to the up/down counter 150 of the digital circuitry 146. In this way, the counter 150 will keep the default value of the count, which will have a default analog value applied to bipolar junction transistor 120. In another embodiment, another type of software, firmware, or digital control may be implemented. After enabling the signal conditioning for some time, the clock signal CLK can be prevented from clocking the peak comparator 134 so that the signal conditioning loop is disabled. In particular, the counter 150 will maintain the previous count and, hence, the same emitter modification signal will be transmitted to the bipolar junction transistor during the time that the clock signal CLK is stopped.

At block 228, the peak detector 130 determines if a peak of the input sinusoidal signal is detected. If a peak is not detected, then the peak detector 130 continues to sample the input sinusoidal signal until an occurrence of peak is detected. Once a peak is detected, at block 230, the differential signal circuit 140 compares the differential signal amplitude to one or more reference signals to determine, at block 232, if the differential signal amplitude is within the differential signal amplitude window 180. Similar to the method 200 shown in FIG. 7, at block 234, if the differential signal amplitude is within the differential signal amplitude window 180, then at block 234 there is no change to the input differential sinusoidal signal.

Otherwise, if the differential signal amplitude is not within the differential signal amplitude window 180, then at block 236, the differential signal circuit 140 determines if the differential signal amplitude is below the lower window threshold. In one embodiment, the operations of blocks 236 and 232 are combined by virtue of simultaneously comparing the differential signal amplitude to high and low window thresholds. At block 238, if the differential signal amplitude is below the low window threshold (and, hence, also below the high window threshold) then the digital circuitry 146 increases the count of the counter 150 in order to increase the drive signal to the emitter 102. Otherwise, at block 240, if the differential signal amplitude is not below the low window threshold (and, hence above the high window threshold because it is not within the differential signal amplitude window 180), then the digital circuitry 146 decreases the count of the counter 150 in order to decrease the drive signal to the emitter 102.

At block 242, the digital circuitry 146 determines if the counter 150 reaches a count limit. At block 244, if the counter 150 does not reach the count limit, then the digital circuitry 146 clears an error signal (e.g., asserts a clear bit to ensure that the error signal is not asserted). Otherwise, at block 246, if the counter 150 reaches the count limit, then the digital circuitry 146 triggers an error signal to indicate that the differential signal amplitude is outside of a detectable range of the signal conditioning circuit 110. The depicted method 200 then ends.

Figure 9:
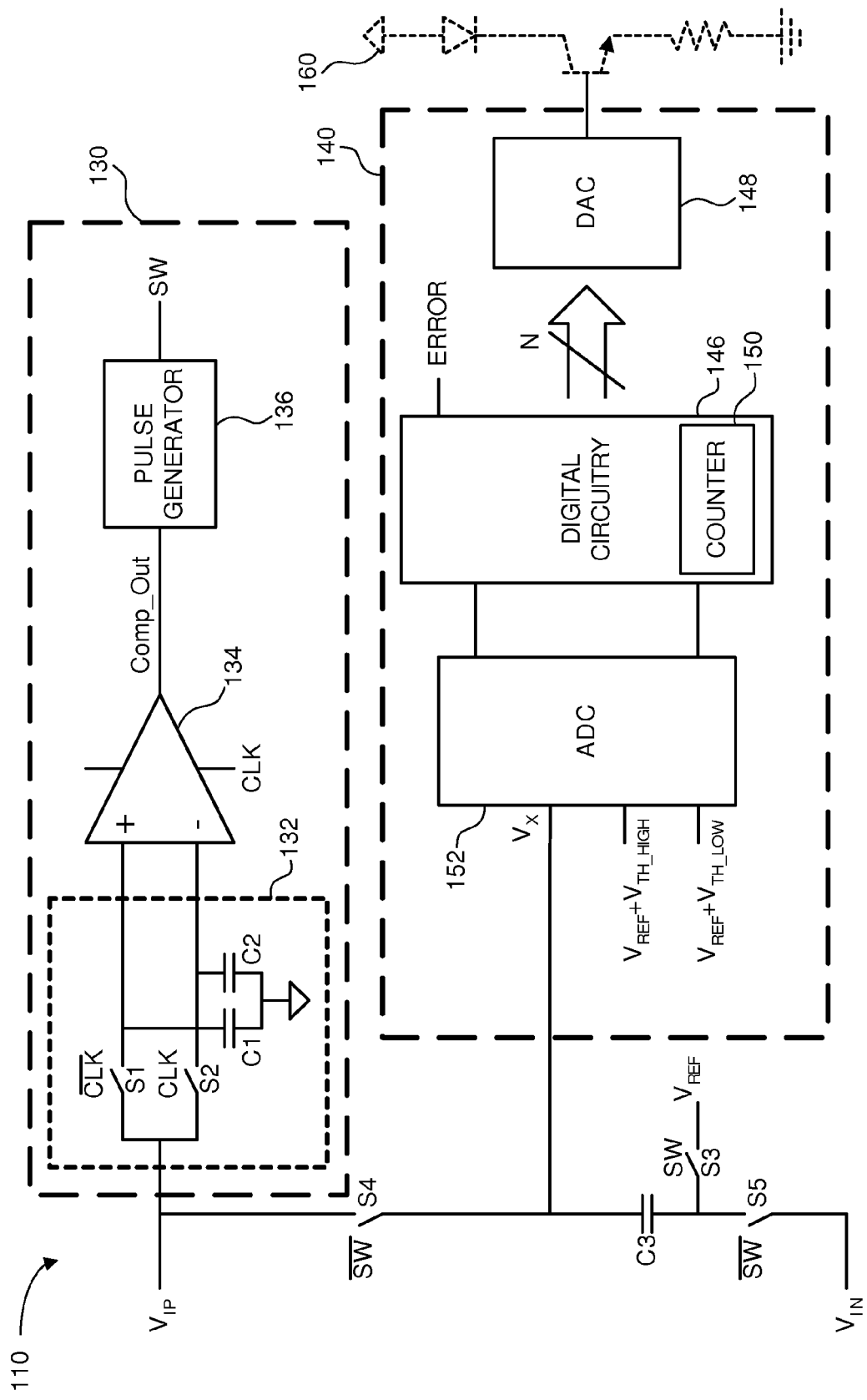
FIG. 9 depicts a schematic diagram of an alternative embodiment of a signal conditioning circuit.

FIG. 9 depicts a schematic diagram of an alternative embodiment of a signal conditioning circuit 110. The embodiment of the signal conditioning circuit 110 shown in FIG. 9 is substantially similar to the embodiment of the signal conditioning circuit 110 shown in FIG. 2, except the signal conditioning circuit 110 shown in FIG. 9 includes and analog-to-digital converter (ADC) 152, instead of the high and low threshold comparators 142 and 144. In one embodiment, the ADC 152 provides similar functionality as the high and low threshold comparators 142 and 144. However, the peak-to-peak value is converted into the digital domain to be compared with one or more reference voltages. The difference, if any, detected by this comparison may be directly added to or subtracted from the previous count of the counter 150. In this way, signal conditioning can be provided within approximately one to three iterations.

FIG. 10 depicts a schematic diagram of an alternative embodiment of a signal conditioning circuit 110 to detect a peak value, instead of a peak-to-peak value, of an input signal. In some respects, the signal conditioning circuit 110 of FIG. 10 operations in a manner substantially similar to the signal conditioning circuit 110 of FIG. 2. When the input sinusoidal signal is monotonically increasing during time frame T1, capacitor C1 is charged during the low logic level (i.e., Φ2) of the clock signal CLK. Similarly, capacitor C2 will be charged during the high logic level (i.e., Φ1) of the clock signal CLK, during which time capacitor C1 will hold the charge of the prior portion of the clock cycle. Hence, the peak comparator 134 will maintain a logical low at the output.

When an occurrence of a peak of the input sinusoidal signal arrives and the input sinusoidal signal starts monotonically decreasing, during time frame T2, the peak comparator signal will be switched to high, and the pulse generator 136 will generate a switch pulse SW. When the switch pulse SW is generated (e.g., about one clock after peak is arrived), capacitor C1 will still be holding charge of previous cycle Φ2 and therefore it is potentially very close to the actual peak value. Subsequently, capacitor C1 is disconnected during the switch pulse SW using switches S6 and S7 and connected to the differential signal circuit 140 using switch S4, described in more detail above. Capacitor C1 is connected back to the peak detector 130 again in the next clock cycle when there is a logical low output of the pulse generator 136. Other operations of the signal conditioning circuit 110 shown in FIG. 9 are substantially similar to the signal conditioning circuit 110 shown in FIG. 2 and described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An encoder with signal conditioning of an emitter drive signal, the encoder comprising:

a peak comparator to output a peak comparator signal based on a comparison of an input sinusoidal signal stored at a first time with the input sinusoidal signal stored at a second time;

a pulse generator coupled to the peak comparator, the pulse generator to determine a peak of the input sinusoidal signal based on the peak comparator signal;

a threshold comparator coupled to the pulse generator, the threshold comparator to compare a differential signal amplitude with a differential signal amplitude window at approximately the peak of the input sinusoidal signal, wherein the differential signal amplitude is associated with the input sinusoidal signal; and digital circuitry coupled to the threshold comparator, the digital circuitry to generate an emitter modification signal in response to a determination that the differential signal amplitude is outside of the differential signal amplitude window.

2. The encoder of claim 1 further comprising a switched capacitor circuit coupled to the peak comparator, the switched capacitor circuit comprising a plurality of capacitors coupled to a corresponding plurality of switches, wherein a first switched capacitor is configured to store the input sinusoidal signal at the first time, and a second switched capacitor is configured to store the input sinusoidal signal at the second time.

3. The encoder of claim 1 wherein the pulse generator is further configured to generate a switch pulse at approximately the peak of the input sinusoidal signal, the switch pulse to control the threshold comparator.

4. The encoder of claim 3 wherein the threshold comparator comprises a high threshold comparator and a low threshold comparator, wherein the high threshold comparator is configured to determine if the differential signal amplitude is lower than a high window threshold of the differential signal amplitude window, and the low threshold comparator is configured to determine if the differential signal amplitude is higher than a low window threshold of the differential signal amplitude window.

5. The encoder of claim 3 wherein the threshold comparator comprises an analog-to-digital converter (ADC).

6. The encoder of claim 1 further comprising a digital-to-analog converter (DAC) coupled between an output of the digital circuitry and a base of a bipolar junction transistor (BJT), the digital-to-analog converter configured to convert the emitter modification signal from a digital signal to an analog signal to change a base voltage of the bipolar junction transistor, wherein the bipolar junction transistor is coupled to an emitter light source.

7. The encoder of claim 1 wherein the digital circuitry is further configured to change a count of an N-bit counter.

8. The encoder of claim 1 wherein the differential signal amplitude is defined as:

$$V_{AMP} = V_{IP} - V_{IN},$$

wherein $V_{IP}$ comprises a first sinusoidal voltage signal derived from a first component, $I_{sin+}$, of a sinusoidal differential current signal and VIN comprises a second sinusoidal voltage signal derived from a second component, $I_{sin-}$, of the sinusoidal differential current signal.

9. A method for conditioning an emitter drive signal of an optical encoder, the method comprising:

comparing an input sinusoidal signal stored at a first time with the input sinusoidal signal stored at a second time to determine a peak of the input sinusoidal signal;

comparing a differential signal amplitude with a differential signal amplitude window at approximately the peak of the input sinusoidal signal, wherein the differential signal amplitude is associated with the input sinusoidal signal; and generating an emitter modification signal in response to a determination that the differential signal amplitude is outside of the differential signal amplitude window.

10. The method of claim 9 further comprising:

storing the input sinusoidal signal at the first time in a first switched capacitor, wherein the first time corresponds to a first portion of a clock cycle; and storing the input sinusoidal signal at the second time after the first time in a second switched capacitor, wherein the second time corresponds to a second portion of the clock cycle.

11. The method of claim 9 further comprising generating a switch pulse at approximately the peak of the input sinusoidal signal to turn on a differential signal circuit, wherein the differential signal circuit enables the comparison of the differential signal amplitude with the differential signal amplitude window and enables the generation of the emitter modification signal.

12. The method of claim 9 wherein comparing the differential signal amplitude to the differential signal amplitude window comprises:

comparing the differential signal amplitude with a high window threshold; and comparing the differential signal amplitude with a low window threshold.

13. The method of claim 9 wherein generating the emitter modification signal comprises changing a base voltage supplied to a bipolar junction transistor (BJT) coupled to an emitter light source.

14. The method of claim 13 further comprising changing an N-bit bit stream by incrementing or decrementing a count of an N-bit counter.

15. The method of claim 9 wherein comparing the differential signal amplitude with the differential signal amplitude window comprises comparing a positive peak of the differential signal amplitude with the differential signal amplitude window.

16. The method of claim 9 wherein comparing the differential signal amplitude with the differential signal amplitude window comprises comparing a negative peak of the differential signal amplitude with the differential signal amplitude window.

17. The method of claim 9 further comprising generating an error signal if the differential signal amplitude is outside of a detectable range.

18. An apparatus for signal conditioning within an encoder, the apparatus comprising:

means for storing an input sinusoidal signal at a plurality of times;

means for determining a peak of the input sinusoidal signal based on the stored input sinusoidal signal; and means for generating an emitter modification signal in response to a determination that a differential signal amplitude is outside of a differential signal amplitude window at approximately the peak of the input sinusoidal signal.

19. The apparatus of claim 18 further comprising means for controlling a plurality of switched capacitors.

20. The apparatus of claim 18 further comprising means for comparing the differential signal amplitude with a high window threshold and a low window threshold of the differential amplitude comparison window.

* * * * *